(12) United States Patent
Morrow

(10) Patent No.: US 6,382,602 B1
(45) Date of Patent: May 7, 2002

(54) APPARATUS FOR RETROFITTING HEIGHT AND LOAD ADJUSTABLE AIR SPRING TO COIL SPRING BASED MAC PHERSON STRUT

(76) Inventor: Joe Morrow, 260 S. Hibbert St., Mesa, AZ (US) 85210

( * ) Notice: Subject to any disclaimer, the term of this patent is extended or adjusted under 35 U.S.C. 154(b) by 0 days.

(21) Appl. No.: 09/764,488

(22) Filed: Jan. 16, 2001

(51) Int. Cl.[7] .................................................. F16F 9/04
(52) U.S. Cl. ............................. 267/64.23; 29/402.08; 29/426.1; 267/122; 267/64.27; 267/64.24
(58) Field of Search .................. 267/122, 64.11–64.28, 267/220, 221, 33–35; 280/124.155, 124.144, 124.147, 124.148, 124.157, 124.16, 124.1, 5.508, 124.163; 29/402.08, 426.1, 227, 453, 401.1; 188/298

(56) References Cited

U.S. PATENT DOCUMENTS

| | | | | |
|---|---|---|---|---|
| 2,773,686 A | * | 12/1956 | Nash | 267/64.27 |
| 2,999,681 A | * | 9/1961 | Müller et al. | 267/64.27 |
| 3,682,464 A | * | 8/1972 | Krejcir | 267/64.27 |
| 4,067,558 A | * | 1/1978 | Keijzer et al. | 267/64.11 |
| 4,206,907 A | * | 6/1980 | Harrod | |
| 4,534,545 A | * | 8/1985 | Fannih et al. | 267/64.24 |
| 4,580,798 A | * | 4/1986 | Roelofs | |
| 4,736,931 A | * | 4/1988 | Christophenson | 267/64.26 |
| 4,813,119 A | * | 3/1989 | Vanbeber | 29/402.08 |
| 4,966,387 A | * | 10/1990 | White | |
| 4,988,082 A | * | 1/1991 | Peer | 267/64.24 |
| 4,993,694 A | * | 2/1991 | Gandiglio et al. | 267/122 |
| 5,129,634 A | * | 7/1992 | Harris | 267/64.24 |
| 5,454,550 A | * | 10/1995 | Christopherson | |
| 5,480,129 A | * | 1/1996 | Gilfsdorf et al. | 267/64.24 |
| 5,671,907 A | * | 9/1997 | Arnold | 267/64.27 |
| 5,967,536 A | * | 10/1999 | Spivey et al. | |

* cited by examiner

Primary Examiner—Douglas C. Butler

(57) ABSTRACT

An automotive wheel suspension comprised of a shock-absorbing strut located within a retrofit air spring, which is located where previously a standard coil spring was located. The air spring includes a single, double, or triple convoluted bellow comprised of a rubber bellow and two bead sealing rings mounted eccentrically onto the strut by a fixed lower adapter plate. The strut is also comprised with a rotatable upper adapter plate that allows the air spring to take the place of the previously mounted coil spring in order to allow load and ride height adjustment where beforehand the coil spring allowed none.

1 Claim, 3 Drawing Sheets

APPARATUS FOR RETROFITTING HEIGHT AND LOAD ADJUSTABLE AIR SPRING TO COIL SPRING BASED MAC PHERSON STRUT

TECHNICAL FIELD

The invention relates to automotive and light truck wheel suspension, specifically to that of retrofitting an existing coil spring based Mac Pherson strut and/or a standard coil over strut wheel suspension. This enables the strut to house an air spring where as vehicle height and spring rate is adjustable based on driver preference and/or road conditions.

BACKGROUND OF PRIOR ART

Vehicles often are originally equipped from the manufacturer with wheel suspensions comprised of fluid shock absorber struts in conjunction with coil spring, that are used for suspension of vehicle weight, absorb variation in road surface, vehicle inertia, and to maintain a predesigned vehicle ride height. In some applications, an air spring is used in the original strut suspension design to compensate for the transverse load the strut experiences during jounce and rebound, and also acts to determine a preset ride height and spring rate. In U.S. Pat. No. 4,778,198, it is disclosed that an air spring is mounted substantially eccentric to the strut center line in order to compensate for transverse loading of the strut piston rod caused by jounce and rebound of the wheel. In U.S. Pat. No. 4,911,416, it is also disclosed that an air spring can be mounted eccentrically, offset, or at an angle to the strut axis, the air spring can be cut at a place oblique to the shock axis, all in order to compensate for the transverse loading previously described. In U.S. Pat. Nos. 4,668,774/4,998,082 and 5,129,634 it is also disclosed that an air spring is mounted in such fashion as to compensate for side load. By and large the disclosures of these patents and the use of air springs installed on telescoping shock-absorbing struts are intending to solve the problem of binding by the piston rod with in the shock absorber body.

They intend for an air spring to be a part of the initial strut design to eliminate various problems inherent in a coil spring suspended vehicle. These patents do not, however, make provisions for retrofitting a strut that is originally designed to utilize a coil spring, to an air spring design. Vehicles currently in circulation would require significant modification to utilize any of the above patents. A better design would be to allow a simple modification of an existing strut to house an air spring and require no other modification to the vehicle inner fender structure or upper strut mounting location. The only modification necessary would be to simply exchange a coil spring strut with an air ride retrofit strut of similar design.

Another aspect of air spring suspension known to those in the art is the ability to compensate for increased suspension load by various means and to vary spring rate according to vehicle sensed road conditions including but not limited to road surface variations, cross winds, and vehicle payload variations. In U.S. Pat. No. 5,060,959, a system using an air or coil spring in conjunction with an electrical motor to change ride height and or spring rate based on data received from a multitude of sensors located on moving suspension members. A computer system controls the input necessary for the actuators to change ride height and or spring rate. The computer determines the correct ride height and spring rate based on programmed variables and input from sensors.

Other U.S. patents including but not limited to U.S. Pat. Nos. 4,386,791 and 4,592,540 seek to offer variable dampening or spring rate due to road conditions or other dynamic factors acting upon the vehicle. These do not however, allow the driver to infinitely control the ride height or spring rate based on the drivers preferred road feel, handling characteristics, and also do not allow the driver to control ride height based on aesthetic preference. Most of these are controlled by other means such as computers or devices that are precalibrated. A better design for drivers who wish to be in command of ride height or spring rate would be one that is solely controlled by the driver from inside the passenger compartment.

SUMMARY OF INVENTION

This invention embodies a Mac Pherson strut or a standard coil over strut originally equipped with a coil spring seat located on the strut body and a system of variable dimension mounting plates and air springs. The invention seeks to allow automobiles currently equipped with a coil spring over strut style suspension to be retrofit with an air spring strut suspension. This invention also seeks to allow the driver to control the ride height and spring rate based on individual preference. To retrofit an air spring onto a Mac Pherson strut or a standard coil over strut already equipped with provisions for a coil spring; the strut must be properly prepared for the air spring assembly. The air spring assembly must be designed to have an airtight seal on the strut body and on the piston rod. It must also achieve the desired dimensions for the air bellows to operate within the designed extension and compression. The specifics of this design will be easily understandable when the description of the preferred embodiment is reviewed.

DETAILED DESCRIPTION OF THE PREFERRED EMBODIMENTS

Figure 1:
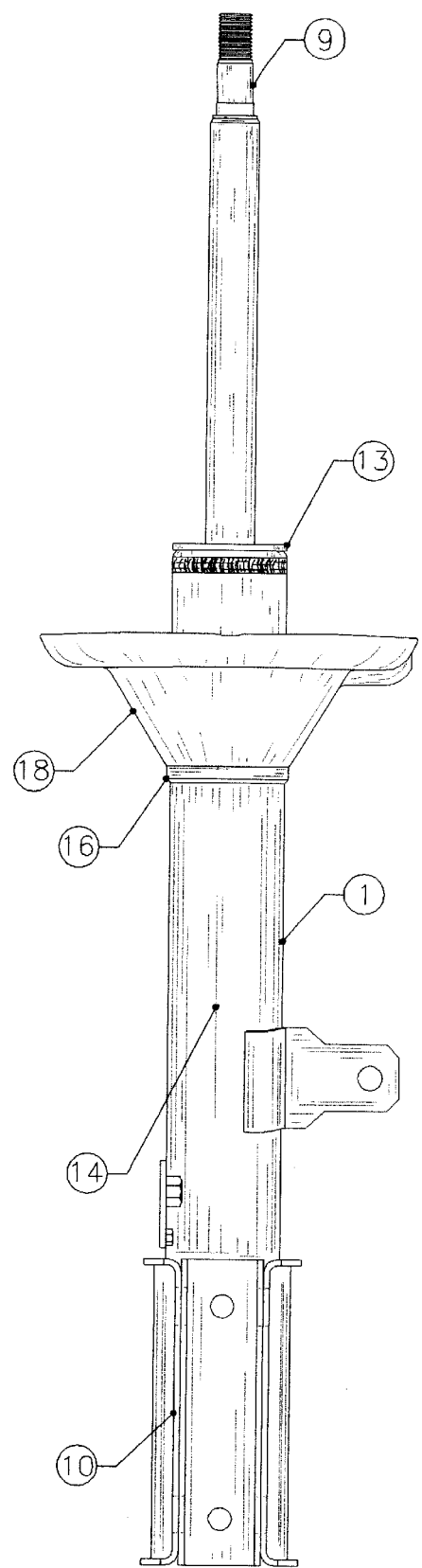
FIG. 1, prior art, is a drawing of an original strut with no modifications yet done to incorporate the air spring.

Referring to FIG. 1, a strut (1) is shown in the stock configuration that is originally equipped on the vehicle. The bump stop seat (13) is modified by removing material from its outside diameter until the outside diameter is slightly less than that of the strut housing (14) in order to allow the lower air spring mount (3, FIGS. 2 & 3) to slid easily down the strut body (14). Next, the lower spring seat (18) is removed from the strut housing (14). Now the original strut (1) is ready to accept the air spring conversion.

Figure 2:
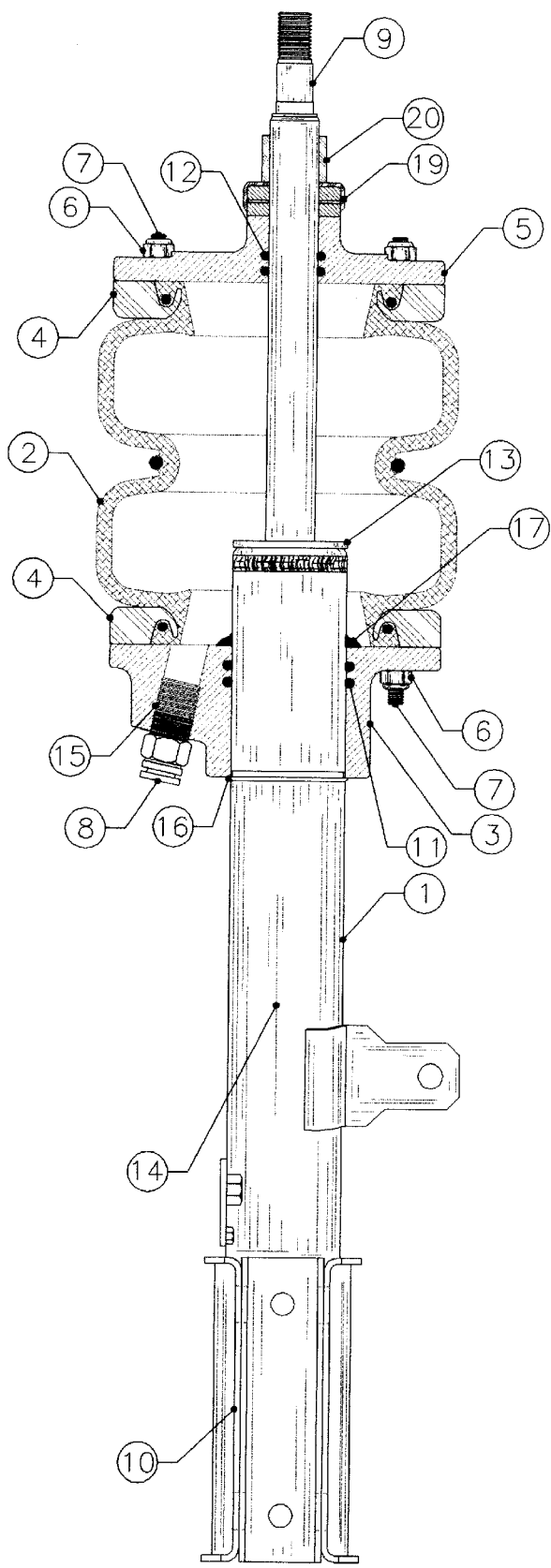
FIG. 2 is a section view of the completed air spring assembly retrofit onto the strut.
Figure 3:
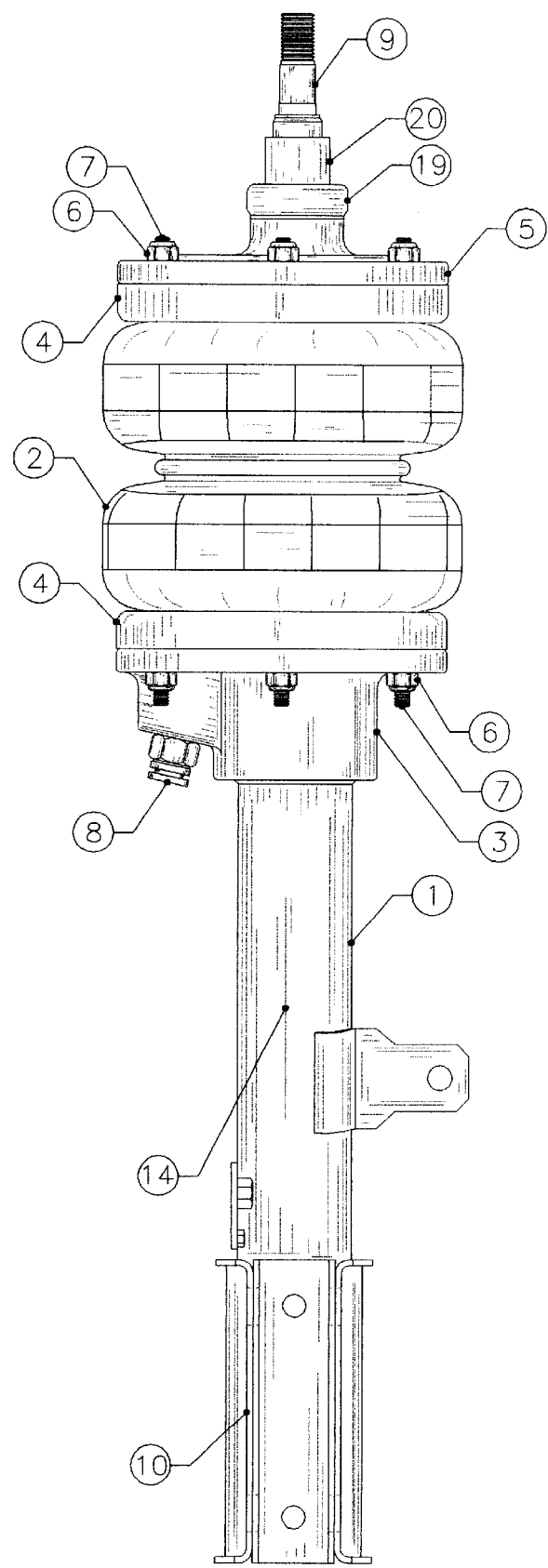
FIG. 3 is a drawing of the completed air spring converted strut showing only external features.

FIG. 2 is a section view of the assembled air spring retrofit strut. Before assembling the air spring onto the strut, the upper (5) and lower (3) air spring mounts must be manufactured to the desired length and inside diameter based on the vehicle specific strut housing (14) and strut piston rod (9). Once brought to the correct dimensions, upper (5) and lower (3) air spring mounts have upper (12) and lower (11) o-rings installed into the machined grooves on the inside diameter of the mounts (3 and 5). The lower air spring mount (3) is slid down the strut body (14) until it is seated on the remaining portion of the weld (16) previously used to attach the original coil spring seat (18). The lower air spring mount (3) is rotated about the strut body so that the air fitting bore (15) is located perpendicular to the lower hub mounting clevis (10) as viewed from either end of the strut. It is also rotated to the side of the strut that is the freest of obstruction such as anti-roll bar mounting tabs and brake line mounting tabs. Once the lower air spring mount (3) is positioned correctly, the lower edge of the lower air spring mount (3) seated on the weld (16) is joined to the strut housing (14).

A fillet of silicone (17) is applied entirely around the upper location where the strut housing (14) passes through the lower air spring mount (3). The fillet of silicone (17) is used in conjunction with the set of o-rings (11) to seal the lower air spring mount (3) to the strut housing (14) in an airtight fashion. The air spring bead sealing rings (4) are installed on to the lower air spring (2). The air spring sub assembly is then secured to the lower air spring mount (3) using six alien head cap screws (7) and related nuts (6). These are equally spaced about the periphery and tightened with such force as to produce an airtight seal between the lower air spring mount (3) and the air spring sub assembly. The upper air spring mount (5) is slid down the strut piston rod (9) until it comes to rest on the top of the air spring sub assembly.

Now six more alien head cap screws (7) are installed through the air spring bead-sealing ring (4), and through the upper air spring mount (5). The associated nuts (6) are tightened on to the alien head cap screws (7) with enough force to ensure an air tight seal between the air spring (2) and the upper air spring mount (5). For this application, the air spring retrofit strut is now completely assembled. However, on different applications varied by make, model, and year of vehicle and location of strut on vehicle, a known bearing (19) or a section of tubing (20) of a desired inside and outside diameter having a designed length may be installed. These components install down the piston shaft (9) to rest upon the uppermost portion of the upper air spring mount (5). These two components may vary in specifications from one application to the other. The known bearing (19) serves the purpose of allowing the completed air spring equipped strut to rotate about the steering axis. The tubing section (20) eliminates any interference between the known upper strut support bushing and any portion of the air spring assembly when the section of tubing is utilized.

What is claimed:

1. A method of converting or retrofitting an existing conventional stock coil spring based MacPherson strut or standard coil over strut wheel suspension configuration to a height and load adjustable air spring, the configuration including a strut (1), strut housing (14), strut piston rod (9), bump stop seat (13), lower spring seat (18), lower hub mounting clevis (10) and a coil spring, the steps comprising:

1) removing the coil spring;

2) removing sufficient material from the outer surface of the bump stop seat (13) so that the outside diameter of the bump stop seat (13) is slightly less than the outer diameter of the strut housing (14) in order to allow a lower air spring mount (3) to slide easily down the strut housing (14) during retrofitting, 3) removing the lower spring seat (18) from the strut housing (14);

4) sliding the lower air spring mount (3), which includes pre-installed O-rings (11) in machined grooves therein, down the strut housing (14) until seated on an existing weld (16), the weld (16) previously used to attach the original coil spring seat (18) to the strut housing (14);

5) rotating and correctly positioning the lower air spring mount (3) about the strut housing (14) so that an air fitting bore (15) is located perpendicular to the lower hub mounting clevis (10) and is located free of obstruction;

6) applying a fillet (17) of silicone entirely around the upper location where the strut housing (14) passes through the lower air spring mount (3) to act in conjunction with the O-rings (11) of the lower spring air spring mount (3) to seal the lower spring air spring mount (3) to the strut housing (14) in an airtight fashion;

7) positioning an air spring (2) around the strut piston rod (9) and the strut housing (14), the air spring (2) having one chamber comprised of a flexible rubber membrane arranged in a single, double or triple bellows orientation, the air spring (2) having upper and lower portions, 8) providing a lower bead sealing ring (4) between the lower portion of the air spring (2) and a top portion of the lower air spring mount (3), 9) securing the lower portion of the air spring (2) to the lower air spring mount (3) by the use of Allen head cap screws (7) and nuts (8);

10) sliding an upper air spring mount (5) down the strut piston rod (9) until it rests on the top of the upper portion of the air spring (2), the upper air spring mount (5) having pre-installed O-rings (12) in machined grooves therein, so as to seal the upper air spring mount (5) to the strut piston rod (9) in an airtight fashion, 11) providing an upper spring bead sealing ring (4) between the upper portion of the air spring (2) and a bottom portion of the upper air spring mount (5), 12) securing the upper portion of the air spring (2) to the upper air spring mount (5) by the use of Allen head cap screws (7) and nuts (8) to ensure an air tight seal between the upper portion of the air spring (2) and the upper air spring mount (5) to thus form a retrofit arrangement.

* * * * *